US012095152B2

(12) United States Patent
Lin et al.

(10) Patent No.: US 12,095,152 B2
(45) Date of Patent: Sep. 17, 2024

(54) ELECTRONIC DEVICE

(71) Applicant: InnoLux Corporation, Miao-Li County (TW)

(72) Inventors: Yi-Hung Lin, Miao-Li County (TW); Tang-Chin Hung, Miao-Li County (TW); Chia-Chi Ho, Miao-Li County (TW); I-Yin Li, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/315,662

(22) Filed: May 11, 2023

(65) Prior Publication Data

US 2023/0282969 A1 Sep. 7, 2023

Related U.S. Application Data

(63) Continuation of application No. 17/462,461, filed on Aug. 31, 2021, now Pat. No. 11,688,934, which is a (Continued)

(30) Foreign Application Priority Data

Apr. 15, 2019 (CN) ......................... 201910300447.3

(51) Int. Cl.
*H01Q 1/38* (2006.01)
*G02B 6/24* (2006.01)
(Continued)

(52) U.S. Cl.
CPC ............. *H01Q 1/36* (2013.01); *H01Q 9/0407* (2013.01); *G09G 2300/0876* (2013.01); *H01Q 3/44* (2013.01)

(58) Field of Classification Search
CPC ........... H01Q 9/0407; H01Q 1/36; G02B 6/24
(Continued)

(56) References Cited

U.S. PATENT DOCUMENTS 1,077,048 A 10/1913 Dobbs et al.
7,411,211 B1 * 8/2008 Yamazaki ........... G02F 1/13454 257/E29.151
(Continued)

FOREIGN PATENT DOCUMENTS

WO 2018/066503 A1 4/2018

OTHER PUBLICATIONS

Korean language office action dated Nov. 29, 2023, issued in application No. KR 10-2019-0112168.

*Primary Examiner* — Kaveh C Kianni
(74) *Attorney, Agent, or Firm* — McClure, Qualey & Rodack, LLP

(57) ABSTRACT

An electronic device is provided. The electronic device includes a substrate, a conductive layer, an insulating layer, and a modulating material. The conductive layer is disposed on the substrate and has a first opening penetrating through the conductive layer. The insulating layer is disposed on the conductive layer and includes a second opening penetrating through the insulating layer. The first opening of the conductive layer and the second opening of the insulating layer are at least partially overlapped. The modulating material is disposed on the insulating layer.

7 Claims, 5 Drawing Sheets

Related U.S. Application Data continuation of application No. 16/546,504, filed on Aug. 21, 2019, now Pat. No. 11,139,562.

(60) Provisional application No. 62/731,141, filed on Sep. 14, 2018.

(51) Int. Cl.
*H01Q 1/36* (2006.01)
*H01Q 9/04* (2006.01)
*H01Q 3/44* (2006.01)

(58) Field of Classification Search
USPC ........................................................ 385/42
See application file for complete search history.

(56) References Cited

U.S. PATENT DOCUMENTS

| | | | | | |
|---|---|---|---|---|---|
| 7,436,050 | B2 * | 10/2008 | Yamazaki | H01L 21/6835 | 257/678 |
| 8,866,984 | B2 * | 10/2014 | Yamazaki | G09G 3/3659 | 349/46 |
| 8,878,175 | B2 * | 11/2014 | Yamazaki | H01L 27/1225 | 257/E21.414 |
| 9,536,903 | B2 * | 1/2017 | Umezaki | H01L 27/0207 | |
| 10,756,118 | B2 * | 8/2020 | Yamazaki | H01L 27/1229 | |
| 10,756,431 | B2 * | 8/2020 | Takahashi | H01Q 1/38 | |
| 10,811,443 | B2 * | 10/2020 | Misaki | H01Q 13/22 | |
| 10,833,422 | B2 * | 11/2020 | Misaki | H01Q 21/065 | |
| 2003/0094612 | A1 * | 5/2003 | Yamazaki | H10K 50/805 | 257/59 |
| 2003/0094614 | A1 * | 5/2003 | Yamazaki | H01L 29/78633 | 438/149 |
| 2004/0241980 | A1 * | 12/2004 | Yamazaki | H01L 21/76843 | 438/623 |
| 2007/0023790 | A1 * | 2/2007 | Ohnuma | H01L 27/1288 | 257/E21.026 |
| 2007/0085112 | A1 * | 4/2007 | Yamazaki | H01L 29/78669 | 257/E21.414 |
| 2009/0114917 | A1 * | 5/2009 | Yamazaki | H01L 29/66765 | 257/E29.004 |
| 2010/0079425 | A1 * | 4/2010 | Yamazaki | G02F 1/134363 | 345/206 |
| 2010/0224872 | A1 * | 9/2010 | Kimura | H01L 29/458 | 257/E33.013 |
| 2011/0062432 | A1 * | 3/2011 | Yamazaki | H01L 29/7869 | 257/E29.296 |
| 2011/0068334 | A1 * | 3/2011 | Yamazaki | B82Y 30/00 | 257/43 |
| 2011/0085635 | A1 * | 4/2011 | Koyama | H01L 27/1225 | 377/78 |
| 2011/0133179 | A1 * | 6/2011 | Yamazaki | H01L 29/66969 | 257/E21.409 |
| 2011/0241011 | A1 * | 10/2011 | Koyama | G09G 3/3648 | 257/71 |
| 2012/0001847 | A1 * | 1/2012 | Kozuma | G06F 3/042 | 345/156 |
| 2012/0001874 | A1 * | 1/2012 | Kurokawa | G06F 1/3206 | 345/175 |
| 2012/0050196 | A1 * | 3/2012 | Kurokawa | G06F 3/041 | 345/173 |
| 2012/0241769 | A1 * | 9/2012 | Katoh | G02F 1/13338 | 257/458 |
| 2013/0105792 | A1 * | 5/2013 | Yamazaki | C23C 14/3414 | 252/519.15 |
| 2016/0233235 | A1 * | 8/2016 | Miyairi | H01L 27/124 | |
| 2016/0328051 | A1 * | 11/2016 | Shishido | G06F 3/0412 | |
| 2017/0018647 | A1 * | 1/2017 | Yamazaki | H01L 27/1225 | |
| 2017/0040457 | A1 * | 2/2017 | Okazaki | H01L 21/441 | |
| 2017/0207347 | A1 * | 7/2017 | Endo | H01L 27/1211 | |
| 2017/0288155 | A1 * | 10/2017 | Kurihara | C07F 15/0033 | |
| 2017/0352777 | A1 * | 12/2017 | Yamazaki | H01L 27/124 | |
| 2018/0033362 | A1 * | 2/2018 | Yamazaki | G09G 3/3648 | |
| 2018/0039125 | A1 * | 2/2018 | Kubota | G06F 3/0412 | |
| 2018/0095312 | A1 * | 4/2018 | Kubota | G02F 1/133553 | |
| 2018/0113566 | A1 * | 4/2018 | Shigemori | G06F 3/04186 | |
| 2018/0143473 | A1 * | 5/2018 | Yamazaki | G02F 1/136286 | |
| 2018/0196322 | A1 * | 7/2018 | Yamazaki | G02F 1/136213 | |
| 2018/0203319 | A1 * | 7/2018 | Yamazaki | G02F 1/133514 | |
| 2018/0219025 | A1 * | 8/2018 | Takahashi | G09G 3/3659 | |
| 2018/0294287 | A1 * | 10/2018 | Yamazaki | H01L 29/7869 | |
| 2019/0165471 | A1 * | 5/2019 | Takahashi | H01Q 21/0087 | |
| 2019/0173173 | A1 * | 6/2019 | Misaki | H01Q 9/0414 | |
| 2019/0265527 | A1 * | 8/2019 | Misaki | H01Q 3/44 | |
| 2019/0265532 | A1 * | 8/2019 | Yamazaki | G06F 3/04166 | |
| 2019/0273162 | A1 * | 9/2019 | Misaki | H01Q 21/0012 | |
| 2019/0296057 | A1 * | 9/2019 | Misaki | H01Q 21/065 | |
| 2019/0341691 | A1 * | 11/2019 | Misaki | H01L 29/786 | |
| 2019/0342564 | A1 * | 11/2019 | Kurokawa | H03K 3/3562 | |
| 2019/0385960 | A1 * | 12/2019 | Misaki | H01L 27/1255 | |
| 2020/0014120 | A1 * | 1/2020 | Misaki | G02F 1/13 | |
| 2020/0083604 | A1 * | 3/2020 | Misaki | H01L 27/1255 | |
| 2020/0091594 | A1 * | 3/2020 | Lin | H01Q 9/0407 | |
| 2020/0091596 | A1 * | 3/2020 | Lin | H01Q 1/364 | |
| 2020/0112106 | A1 * | 4/2020 | Misaki | H01Q 21/065 | |
| 2020/0119445 | A1 * | 4/2020 | Misaki | H01Q 21/0012 | |
| 2020/0127012 | A1 * | 4/2020 | Misaki | H01L 27/124 | |
| 2020/0203532 | A1 * | 6/2020 | Yamazaki | H01L 29/7869 | |
| 2021/0005738 | A1 * | 1/2021 | Okazaki | H01L 21/47635 | |

* cited by examiner

ELECTRONIC DEVICE

CROSS REFERENCE TO RELATED APPLICATIONS

This application is a Continuation of U.S. patent application Ser. No. 17/462,461, filed on Aug. 31, 2021 and entitled "ANTENNA DEVICE" (now U.S. Pat. No. 11,688,934), which is a Continuation of U.S. patent application Ser. No. 16/546,504, filed on Aug. 21, 2019 and entitled "ANTENNA DEVICE" (now U.S. Pat. No. 11,139,562), which claims priority of U.S. Provisional Patent Application No. 62/731,141, filed on Sep. 14, 2018, and Chinese Patent Application No. 201910300447.3, filed on Apr. 15, 2019, the entirety of which are incorporated by reference herein.

BACKGROUND

Technical Field

The present disclosure relates to an electronic device, and in particular it relates to an antenna having an insulating structure with varied thickness.

Description of the Related Art

Electronic products that come with a display panel, such as smartphones, tablets, notebooks, monitors, and TVs, have become indispensable necessities in modern society. With the flourishing development of such portable electronic products, consumers have high expectations regarding the quality, functionality, or price of such products. Such electronic products can generally be used as electronic modulation devices as well, for example, as antenna devices that can modulate electromagnetic waves.

Although currently existing antenna devices have been adequate for their intended purposes, they have not been satisfactory in all respects. The development of an antenna device that can effectively maintain capacitance modulation stability or operational reliability is still one of the goals that the industry currently aims for.

SUMMARY

In accordance with some embodiments of the present disclosure, an electronic device is provided. The electronic device includes a substrate, a conductive layer, an insulating layer, and a modulating material. The conductive layer is disposed on the substrate and has a first opening penetrating through the conductive layer. The insulating layer is disposed on the conductive layer and includes a second opening penetrating through the insulating layer. The first opening of the conductive layer and the second opening of the insulating layer are at least partially overlapped. The modulating material is disposed on the insulating layer.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
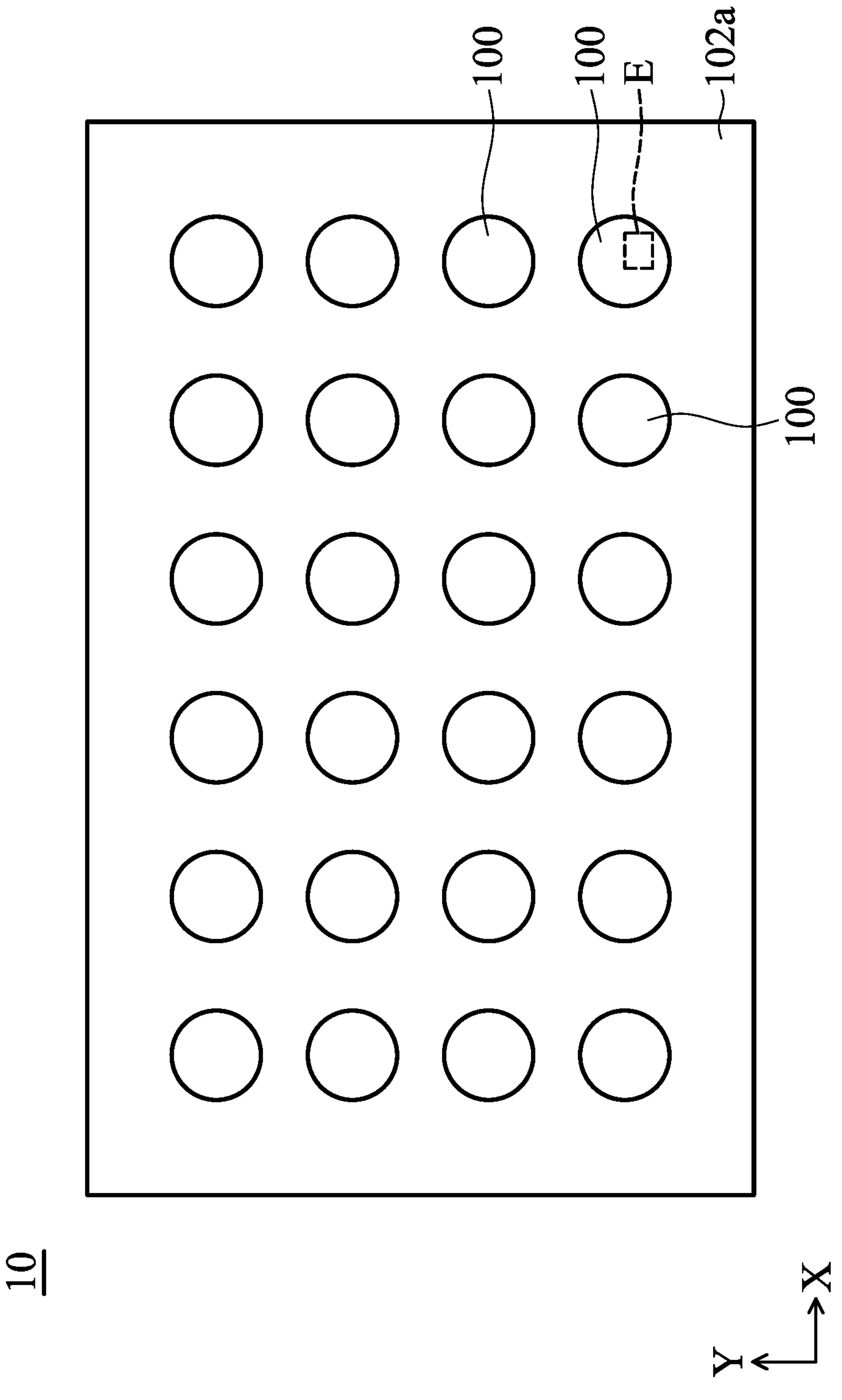
FIG. 1 illustrates the top-view diagram of the electronic device in accordance with some embodiments of the present disclosure.

The structure of the electronic device of the present disclosure and the manufacturing method thereof are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those with ordinary skill in the art. In addition, in the embodiments, relative expressions are used. For example, "lower", "bottom", "higher" or "top" are used to describe the position of one element relative to another. It should be appreciated that if a device is flipped upside down, an element that is "lower" will become an element that is "higher". It should be understood that the descriptions of the exemplary embodiments are intended to be read in connection with the accompanying drawings, which are to be considered part of the entire written description. The drawings are not drawn to scale. In addition, structures and devices are shown schematically in order to simplify the drawing.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

The terms "about" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially". Furthermore, the phrase "in a range between a first value and a second value" or "in a range from a first value to a second value" indicates that the range includes the first value, the second value, and other values between them.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, an electronic device (e.g., an antenna device) having an insulating structure with varied thickness is provided. Specifically, in accordance with some embodiments, the insulating structure may have a smaller thickness in a portion corresponding to the capacitance adjustable region, thereby maintaining stability of capacitance modulation or increasing operational reliability of the device. In accordance with some embodiments, the insulating structure may have a greater thickness in a portion other than the capacitance adjustable region, which may reduce the risk of corrosion of the conductive layer or diffusion of metal ions.

Refer to FIG. 1, which illustrates a top-view diagram of an electronic device 10 in accordance with some embodiments of the present disclosure. It should be understood that only some of the components of the electronic device 10 are shown in FIG. 1 and other components are omitted for clarity of illustration. The structure of other components will be described in detail in the following figures. In accordance with some embodiments of the present disclosure, additional features may be added to the electronic device 10 described below.

As shown in FIG. 1, the electronic device 10 may include a first substrate 102*a* and a plurality of electronic units 100 disposed on the first substrate 102*a*. In accordance with some embodiments, the electronic device 10 may include an antenna device, a display device (e.g., a liquid-crystal display (LCD)), a light-emitting device, a detecting device, or another device for modulating electromagnetic waves, but it is not limited thereto. In some embodiments, the electronic device 10 may be an antenna device, and the electronic unit 100 may be an antenna unit for modulating electromagnetic waves (e.g., microwaves). It should be understood that the arrangement of the electronic units 100 is not limited to the aspect shown in FIG. 1. In accordance with some other embodiments, the electronic units 100 may be arranged in another suitable manner.

In some embodiments, the material of the first substrate 102*a* may include, but is not limited to, glass, quartz, sapphire, ceramic, polyimide (PI), liquid-crystal polymer (LCP) materials, polycarbonate (PC), photo sensitive polyimide (PSPI), polyethylene terephthalate (PET), other suitable substrate materials, or a combination thereof. In some embodiments, the first substrate 102*a* may include a flexible substrate, a rigid substrate, or a combination thereof.

Figure 2A:
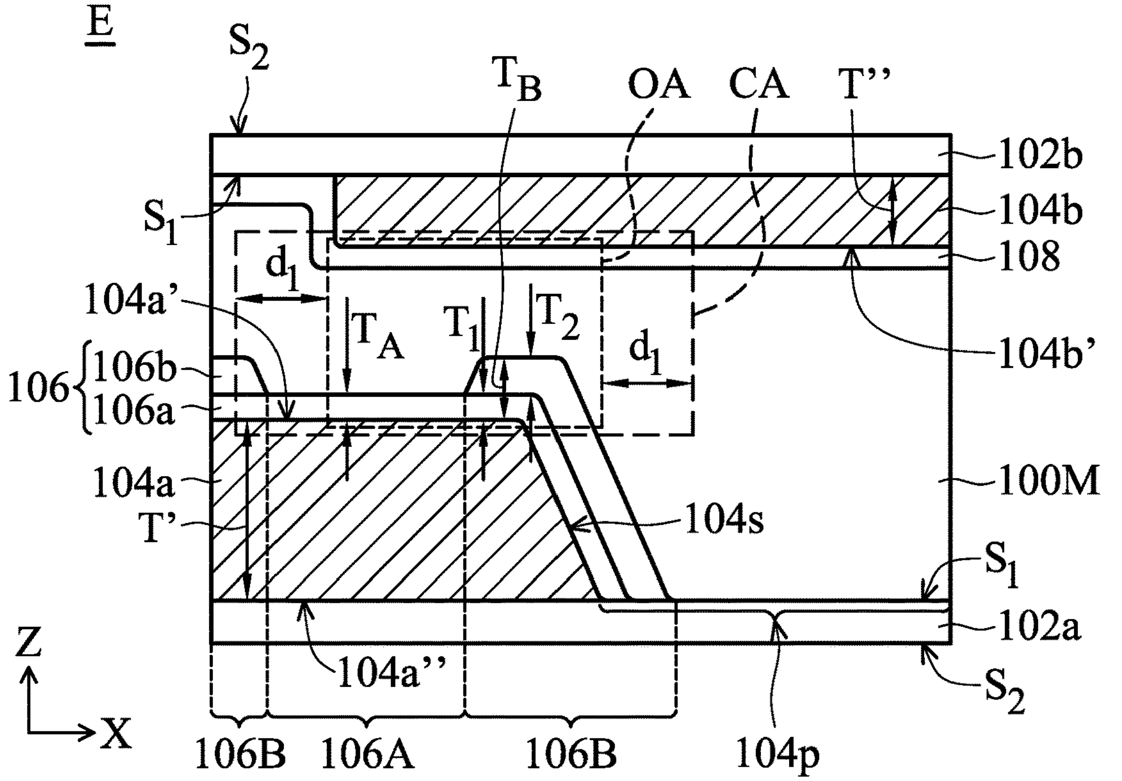
FIG. 2A illustrates the cross-sectional diagram of a portion of the electronic device in accordance with some embodiments of the present disclosure.

Next, refer to FIG. 2A, which illustrates a cross-sectional structural diagram of a portion of the electronic device 10 in accordance with some embodiments of the present disclosure. Specifically, FIG. 2A illustrates an enlarged cross-sectional diagram of a region E of the electronic unit 100 shown in FIG. 1 in accordance with some embodiments of the present disclosure. As shown in FIG. 2A, the electronic device 10 may include a first substrate 102*a*, a second substrate 102*b*, a first conductive layer 104*a*, and a second conductive layer 104*b*.

The second substrate 102*b* may be disposed opposite to the first substrate 102*a*. In some embodiments, the material of the second substrate 102*b* may include, but is not limited to, glass, quartz, sapphire, ceramic, polyimide (PI), liquid-crystal polymer (LCP) materials, polycarbonate (PC), photo-sensitive polyimide (PSPI), polyethylene terephthalate (PET), other suitable substrate materials, or a combination thereof. In some embodiments, the second substrate 102*b* may include a flexible substrate, a rigid substrate, or a combination thereof. In some embodiments, the material of the second substrate 102*b* may be the same as or different from the material of the first substrate 102*a*.

Moreover, the first conductive layer 104*a* may be disposed on the first substrate 102*a*. Specifically, the first conductive layer 104*a* may be disposed on a first surface $S_1$ of the first substrate 102*a*, and the first surface $S_1$ and a second surface $S_2$ of the first substrate 102*a* are located on opposite sides. In addition, the second conductive layer 104*b* may be disposed on the second substrate 102*b* and located between the first substrate 102*a* and the second substrate 102*b*. Specifically, the second conductive layer 104*b* may be disposed on the first surface $S_1$ of the second substrate 102*b*, and the first surface $S_1$ of the second substrate 102*b* is adjacent to the first substrate 102*a*.

As shown in FIG. 2A, in some embodiments, the first conductive layer 104*a* may have an opening 104*p*, and the opening 104*p* may overlap the second conductive layer 104*b*. In accordance with the embodiments of the present disclosure, the opening 104*p* may be defined as a region that is exposed by the first conductive layer 104*a*. That is, the opening 104*p* may substantially correspond to the region of the first surface $S_1$ of the first substrate 102*a* that is not covered by the first conductive layer 104*a*. In addition, the second conductive layer 104*b* may overlap the first conductive layer 104*a*. In accordance with some embodiments of the present disclosure, the term "overlap" may include partial overlap or entire overlap in the normal direction of the first substrate 102*a* or the second substrate 102*b* (e.g., the Z direction shown in the figure).

Specifically, in some embodiments, the first conductive layer 104*a* may be patterned to have an opening 104*p*. In some embodiments, the second conductive layer 104*b* may also be patterned to have multiple regions (only a portion of the second conductive layer 104*b* is illustrated in the figure). In some embodiments, multiple regions of the second conductive layer 104*b* may be connected to different circuits.

In some embodiments, the second conductive layer 104*b* may be electrically connected to a functional circuit (not illustrated). The functional circuit may include active components (e.g., thin film transistors and/or chips) or passive components. In some embodiments, the functional circuit may be located on the first surface $S_1$ of the second substrate 102*b* as the second conductive layer 104*b*. In some other embodiments, the functional circuit may be located on the second surface $S_2$ of the second substrate 102*b*, and the functional circuit may be electrically connected to the second conductive layer 104*b*, for example, through a via hole (not illustrated) that penetrates the second substrate 102*b*, a flexible circuit board, or another suitable method for electrical connection, but it is not limited thereto.

In some embodiments, the first conductive layer 104*a* and the second conductive layer 104*b* may include a conductive metal material. In some embodiments, the materials of the first conductive layer 104*a* and the second conductive layer 104*b* may include, but are not limited to, copper, silver, tin, aluminum, molybdenum, tungsten, gold, chromium, nickel, platinum, copper alloy, silver alloy, tin alloy, aluminum alloy, molybdenum alloy, tungsten alloy, gold alloy, chromium alloy, nickel alloy, platinum alloy, other suitable conductive materials or a combination thereof.

Moreover, the first conductive layer 104*a* may have a thickness T', and the second conductive layer 104*b* may have a thickness T". In some embodiments, the thickness T' of the first conductive layer 104*a* may be in a range from 0.5 micrometers (μm) to 4 micrometers (μm) (i.e. 0.5 μm≤the thickness T'≤4 μm), from 1.5 μm to 3.5 μm, or from 2 μm to 3 μm. In some embodiments, the thickness T" of the second conductive layer 104*b* may be in a range from 0.5 μm to 4 μm (i.e. 0.5 μm≤the thickness T"≤4 μm), from 1.5 μm to 3.5 μm, or from 2 μm to 3 μm. Furthermore, the thickness T' of the first conductive layer 104*a* may be the same as or different from the thickness T" of the second conductive layer 104*b*.

In accordance with some embodiments of the present disclosure, the "thickness" of the first conductive layer 104*a* or the second conductive layer 104*b* refers to the maximum thickness of the first conductive layer 104*a* or the second conductive layer 104*b* in the normal direction of the first substrate 102*a* or the second substrate 102*b* (for example, the Z direction shown in the figure).

In some embodiments, the first conductive layer 104*a* and the second conductive layer 104*b* may be formed by one or more deposition processes, photolithography processes, or etching processes. In some embodiments, the deposition process may include, but is not limited to, a chemical vapor deposition process, a physical vapor deposition process, an electroplating process, an electroless plating process, other suitable processes, or a combination thereof. The physical vapor deposition process may include, but is not limited to, a sputtering process, an evaporation process, a pulsed laser deposition and so on. In addition, in some embodiments, the photolithography process may include photoresist coating (e.g., spin coating), soft baking, hard baking, mask aligning, exposure, post-exposure baking, developing the photoresist, rinsing, drying, or another suitable process. In some embodiments, the etching process may include a dry etching process, a wet etching process, or another suitable etching process.

Moreover, as shown in FIG. 2A, the electronic device 10 may include a first insulating structure 106. The first insulating structure 106 may be disposed on the first conductive layer 104*a* so that the first conductive layer 104*a* may be located between the first substrate 102*a* and the first insulating structure 106. In addition, the first insulating structure 106 may at least partially overlap a top surface 104*a*' and a side surface 104*s* of the first conductive layer 104*a*.

In some embodiments, the first insulating structure 106 may have a multi-layered structure. For example, in some embodiments, the first insulating structure 106 may include a first insulating layer 106*a* and a second insulating layer 106*b* disposed on the first insulating layer 106*a*, but the present disclosure is not limited thereto. In some embodiments, the second insulating layer 106*b* may expose a portion of the first insulating layer 106*a*. In some other embodiments, the first insulating structure 106 may have a single layer structure.

In some embodiments, the electronic device 10 may further include a second insulating structure 108. The second insulating structure 108 may be disposed on the second conductive layer 104*b* so that the second conductive layer 104*b* is located between the second substrate 102*b* and the second insulating structure 108. Similarly, the second insulating structure 108 may also have a multi-layered structure or a single layer structure.

In addition, as shown in FIG. 2A, in some embodiments, the first insulating structure 106 may at least partially extend on the first surface $S_1$ of the first substrate 102*a*. In other words, the first insulating structure 106 may at least partially overlap the opening 104*p*. In some embodiments, the second insulating structure 108 may at least partially extend on the first surface $S_1$ of the second substrate 102*b*.

In some embodiments, the first insulating structure 106 and the second insulating structure 108 may include an insulating material. In some embodiments, the first insulating structure 106 and the second insulating structure 108 may include, but are not limited to, an organic material, an inorganic material, or a combination thereof. The organic material may include, but is not limited to, polyethylene terephthalate (PET), polyethylene (PE), polyethersulfone (PES), polycarbonate (PC), polymethylmethacrylate (PMMA), polyimide (PI), photo-sensitive polyimide (PSPI) or a combination thereof. The inorganic material may include, but is not limited to, silicon nitride, silicon oxide, silicon oxynitride or a combination thereof.

The material of the first insulating structure 106 may be the same as or different from the material of the second insulating structure 108. In addition, in the embodiments in which the first insulating structure 106 or the second insulating structure 108 has a multi-layered structure, the materials of the layers may be the same or different.

In some embodiments, the first insulating structure 106 and the second insulating structure 108 may be formed by a chemical vapor deposition process, a sputtering process, a coating process, a printing process, or another suitable process, or a combination thereof. Furthermore, the first insulating structure 106 and the second insulating structure 108 may be patterned by one or more photolithography processes and etching processes.

In addition, the electronic device 10 may include a modulating material 100M disposed between the first conductive layer 104*a* and the second conductive layer 104*b*. In accordance with some embodiments, a material that can be adjusted to have different properties (e.g., dielectric constants) by applying an electric field or another means can be used as the modulating material 100M. In some embodiments, the transmission direction of the electromagnetic signals through the opening 104*p* may be controlled by applying different electric fields to the modulating material 100M to adjust the capacitance.

In some embodiments, the modulating material 100M may include, but is not limited to, liquid-crystal molecules (not illustrated) or microelectromechanical systems (MEMS). For example, in some embodiments, the electronic device 10 may include an electromagnetic element that can be used to emit or receive electromagnetic signals or a MEMS-based antenna unit, but it is not limited thereto. In accordance with some embodiments, the modulating material 100M may include a liquid-crystal layer.

Specifically, in some embodiments, the functional circuit described above may apply a voltage to the second conductive layer 104*b*, and change the properties of the modulating material 100M between the first conductive layer 104*a* and the second conductive layer 104*b* by an electric field that is generated between the first conductive layer 104*a* and the second conductive layer 104*b*. Furthermore, the functional circuit may also apply another voltage to the first conductive layer 104*a*, but it is not limited thereto. In some other embodiments, the first conductive layer 104*a* may be electrically floating, grounded, or connected to another functional circuit (not illustrated), but it is not limited thereto.

It should be understood that one with ordinary skill in the art may adjust the number, shape or arrangement of the first conductive layer 104*a*, the second conductive layer 104*b* and the corresponding opening 104*p* according to needs, and they are not limited to the aspect illustrated in the figure.

In addition, as shown in FIG. 2A, the thickness of the first insulating structure 106 on the first conductive layer 104*a* may be varied in accordance with some embodiments. More specifically, in some embodiments, the thickness of the first insulating structure 106 on the top surface 104*a*' of the first conductive layer 104*a* may be varied. In some embodiments, the first insulating structure 106 may include a first region 106A and a second region 106B. The first region 106A may have a thickness $T_A$ and the second region 106B may have a thickness $T_B$. In some embodiments, the thickness $T_A$ of the first region 106A may be less than a thickness $T_B$ of the second region 106B, and at least a portion of the first region 106A may be disposed in an overlapping region OA of the first conductive layer 104*a* and the second conductive layer 104*b*. In some embodiments, the first region 106A may be entirely disposed in the overlapping region OA.

In some embodiments, the difference between the thickness $T_B$ of the second region 106B and the thickness $T_A$ of the first region 106A may be in a range from 0.1 μm to 3 μm (i.e. 0.1 μm≤the thickness $T_A$≤3 μm), from 0.5 μm to 2.5 μm, or from 1 μm to 2 μm. It should be noted that if the difference between the thickness $T_A$ and the thickness $T_B$ is too large (for example, greater than 3 μm), the thicker insulating structure may affect the cell gap of the electronic device, thereby affecting the ability of the capacitance modulation. On the contrary, if the difference between $T_A$ and thickness $T_B$ is too small (for example, less than 0.1 μm), the ability to maintain the stability of capacitance modulation may not be significant.

It should be understood that, in accordance with some embodiments of the present disclosure, "the overlapping region OA of the first conductive layer 104*a* and the second conductive layer 104*b*" refers to the overlapping region of the bottom surface 104*a*" of the first conductive layer 104*a* and the top surface 104*b*' of the second conductive layer 104*b* in the normal direction of the first substrate 102*a* or the second substrate 102*b* (for example, the Z direction shown in the figure).

In addition, in accordance with some embodiments of the present disclosure, the "thickness" of the first region 106A or the second region 106B refers to the maximum thickness of the first region 106A or the second region 106B on the top surface 104*a*' of the first conductive layer 104*a* in the normal direction of the first substrate 102*a* or the second substrate 102*b* (for example, the Z direction shown in the figure). In addition, the thicknesses of the first insulating layer 106*a* and the second insulating layer 106*b* described below are also defined in the similar manner. Furthermore, in accordance with the embodiments of the present disclosure, the thickness of each component may be measured by using an optical microscopy (OM), a scanning electron microscope (SEM), a film thickness profiler (α-step), an ellipsometer, or another suitable method. Specifically, in some embodiments, after the modulating material 100M is removed, a cross-sectional image of the structure can be taken using a scanning electron microscope, and the thickness of each component in the above image can be measured. Moreover, the maximum thickness as described above may be the maximum thickness in any cross-sectional image. In other words, the maximum thickness as described above may be the maximum thickness in a partial region of the electronic device 10.

Figure 2B:
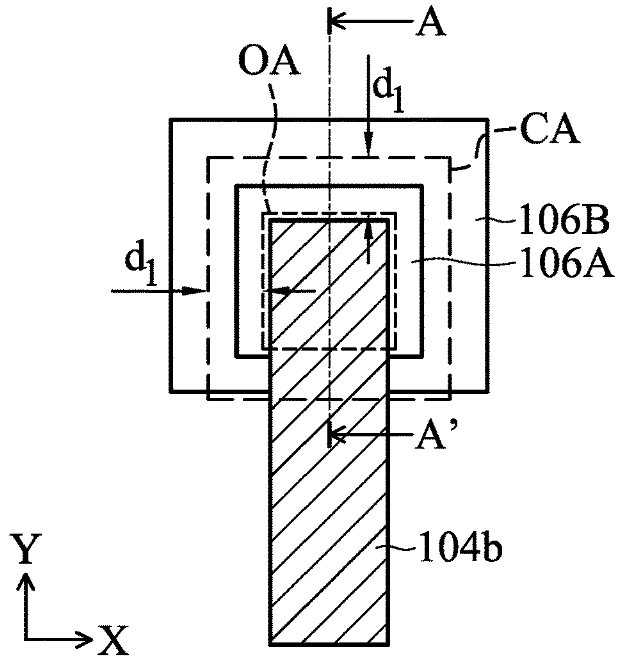
FIG. 2B illustrates the top-view diagram of a portion of the electronic device in accordance with some embodiments of the present disclosure.

In accordance with some embodiments, the overlapping region OA may substantially define a capacitance adjustable region CA. Referring to FIG. 2B at the same time, FIG. 2B illustrates the top-view diagram of a portion of the electronic device 10 in accordance with some embodiments of the present disclosure, and FIG. 2A is the cross-sectional structure along the line segment A-A' in FIG. 2B. It should be understood that only the second conductive layer 104*b* and the first insulating structure 106 are shown in FIG. 2B and other components are omitted in order to clearly illustrate the relationship between the overlapping region OA and the capacitance adjustable region CA.

Specifically, the first conductive layer 104*a* and the second conductive layer 104*b* and the modulating material 100M located therebetween may form a capacitor structure. The capacitance adjustable region CA of the capacitor structure may substantially correspond to the overlapping region OA and overlap with the overlapping region OA. However, the area where the electromagnetic signal is actually affected by the capacitance will be larger than the overlapping area OA. In accordance with some embodiments, the capacitance adjustable region CA is defined as an area extending outward from the edge of the overlapping region OA by a first distance $d^1$. In some embodiments, the first distance $d_1$ may be about 1 mm.

As described above, in some embodiments, the first insulating structure 106 may include the first insulating layer 106*a* and the second insulating layer 106*b*. In some embodiments, the first region 106A may include the first insulating layer 106*a*, and the second region 106B may include the first insulating layer 106*a* and the second insulating layer 106*b*. As shown in FIGS. 2A and 2B, in some embodiments, the second region 106B may surround the first region 106A, and the second region 106B may be adjacent to the opening 104*p*. Moreover, in some embodiments, the first region 106A and the second conductive layer 104*b* at least partially overlap.

Specifically, the first insulating layer 106*a* may have a thickness $T_1$, and the second insulating layer 106*b* may have a thickness $T_2$. In some embodiments, the thickness $T_2$ of the second insulating layer 106*b* may be greater than the thickness $T_1$ of the first insulating layer 106*a*. In some embodiments, the thickness $T_1$ of the first insulating layer 106*a* may be in a range from 100 angstroms (Å) to 1500 angstroms (Å) (i.e. 100 Å≤the thickness $T_1$≤1500 Å), from 300 Å to 1300 Å, or from 500 Å to 1000 Å, for example, 600 Å, 700 Å, 800 Å, or 900 Å. In some embodiments, the thickness $T_2$ of the second insulating layer 106*b* may be in a range from 500 Å to 3,000 Å (i.e. 500 Å≤the thickness $T_2$≤3000 Å), from 1000

Å to 2500 Å, or from 1500 Å to 2,000 Å, for example, 1600 Å, 1700 Å, 1800 Å, or 1900 Å.

As described above, the first region 106*a* may have a smaller thickness, and the overlapping region OA of the first conductive layer 104*a* and the second conductive layer 104*b* may at least partially overlap with the first region 106A so that the capacitance adjustable region CA may at least partially overlap with the first region 106A. With such a configuration, the dielectric loss of the electromagnetic signals may be reduced, or the stability of the capacitance modulation can be maintained.

On the other hand, the second region 106B may have a greater thickness, and is less likely to generate pinholes during the fabrication process, which may reduce the corrosion of the first conductive layer 104*a* or reduce the diffusion of metal ions of the first conductive layer 104 into the modulating material 100M. In addition, since the second region 106B having a greater thickness is mostly located outside the capacitance adjustable region CA, it may have little effect on the dielectric loss of the electromagnetic signals.

In addition, in accordance with some embodiments, alignment layers (not illustrated) may be further disposed between the first insulating structure 106 and the modulating material 100M, and between the second insulating structure 108 and the modulating material 100M to control the alignment direction of the liquid-crystal molecules in the modulating material 100M. In some embodiments, the material of the alignment layer may include, but is not limited to, an organic material, an inorganic material, or a combination thereof. For example, the organic material may include, but is not limited to, polyimide (PI), a photo-reactive polymer material, or a combination thereof. The inorganic material may include, for example, silicon oxide ($SiO_2$), but it is not limited thereto.

In accordance with some embodiments, a buffer layer (not illustrated) may be further disposed between the first substrate 102*a* and the first conductive layer 104*a*, and between the second substrate 102*b* and the second conductive layer 104*b*, so that the expansion coefficient of the first substrate 102*a* and the first conductive layer 104*a* and/or the expansion coefficient of the second substrate 102*b* and the second conductive layer 104*b* may be matched. In some embodiments, the material of the buffer layer may include, but is not limited to, an organic insulating material, an inorganic insulating material, a metal material, or a combination thereof.

The organic insulating material may include, but is not limited to, an organic compound of acrylic acid or methacrylic acid, an isoprene compound, a phenol-formaldehyde resin, benzocyclobutene (BCB), perfluorocyclobutane (PECB), polyimide, polyethylene terephthalate (PET), or a combination thereof. The inorganic material may include, but is not limited to, silicon nitride, silicon oxide, silicon oxynitride or a combination thereof. The metal material may include, but is not limited to, titanium, molybdenum, tungsten, nickel, aluminum, gold, chromium, platinum, silver, copper, titanium alloy, molybdenum alloy, tungsten alloy, nickel alloy, aluminum alloy, gold alloy, chromium alloy, platinum alloy, silver alloy, copper alloy, another suitable material, or a combination thereof.

In addition, in accordance with some embodiments, the electronic device 10 may further include a spacer element (not illustrated) disposed between the first substrate 102*a* and the second substrate 102*b*. The spacer element may be disposed in the modulating material 100M to enhance the structural strength of the electronic device 10. In some embodiments, the spacer elements may have a ring-shaped structure. In some embodiments, the spacer elements may have columnar structures that are arranged in parallel.

In addition, the spacer element may include an insulating material or a conductive material, or a combination thereof. In some embodiments, the conductive material may include, but is not limited to, copper, silver, gold, copper alloy, silver alloy, gold alloy, or a combination thereof. In some other embodiments, the insulating material may include, but is not limited to, polyethylene terephthalate (PET), polyethylene (PE), polyethersulfone (PES), polycarbonate (PC), polymethylmethacrylate (PMMA), glass or a combination thereof.

Figure 3:
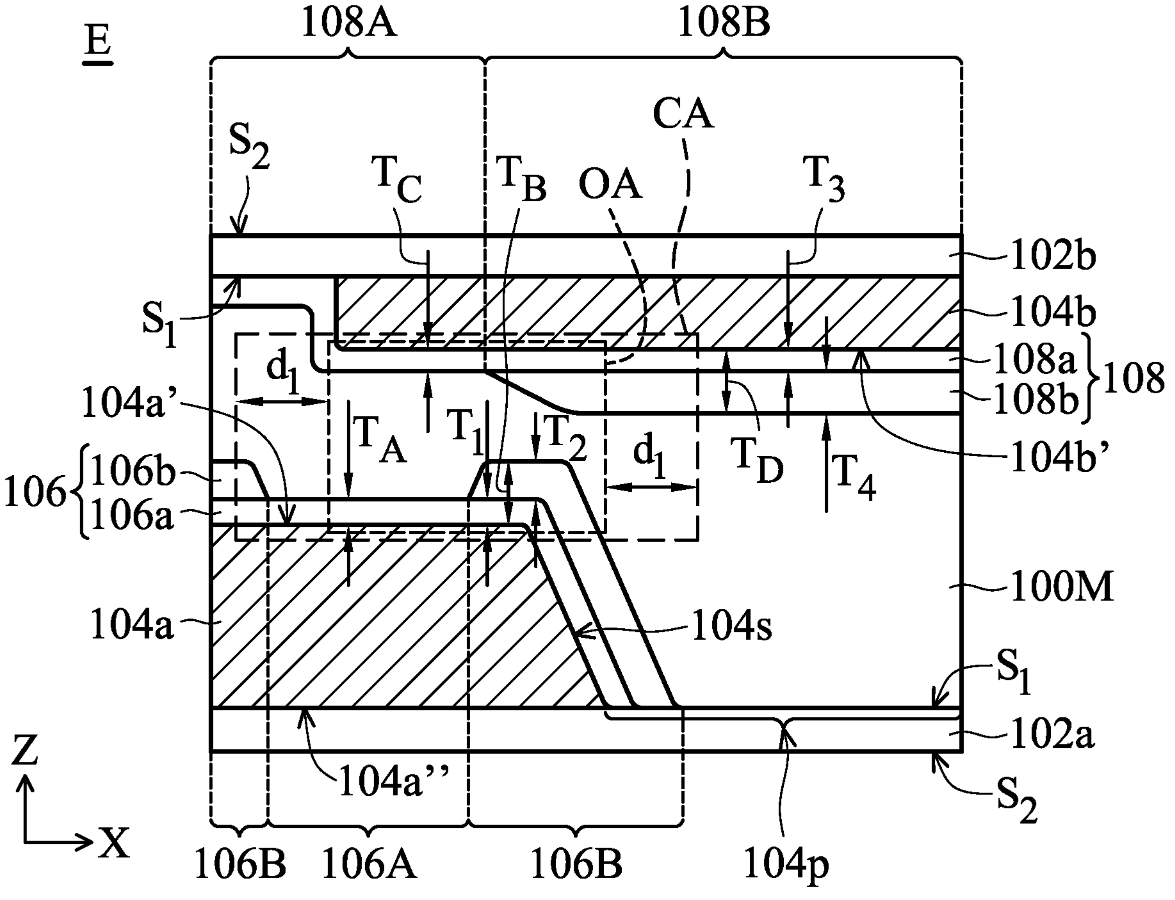
FIG. 3 illustrates the cross-sectional diagram of a portion of the electronic device in accordance with some embodiments of the present disclosure.

Next, refer to FIG. 3, which illustrates the cross-sectional diagram of a portion of the electronic device 10 in accordance with some other embodiments of the present disclosure. Specifically, FIG. 3 illustrates an enlarged cross-sectional diagram of the region E of the electronic unit 100 shown in FIG. 1 in accordance with some other embodiments of the present disclosure. It should be understood that the same or similar components or elements in above and below contexts are represented by the same or similar reference numerals. The materials, manufacturing methods and functions of these components or elements are the same or similar to those described above, and thus will not be repeated herein.

The embodiment shown in FIG. 3 is similar to the embodiment shown in FIG. 2A. The difference between them is that the second insulating structure 108 of the electronic device 10 shown in FIG. 3 also has a greater thickness in a partial region. As shown in FIG. 3, the second insulating structure 108 may be disposed on the second conductive layer 104*b* and located between the second conductive layer 104*b* and the modulating material 100M. In this embodiment, the second insulating structure 108 may include a third insulating layer 108*a* and a fourth insulating layer 108*b* disposed on the third insulating layer 108*a*. The material of the third insulating layer 108*a* may be the same as or different from the material of the fourth insulating layer 108*b*.

As shown in FIG. 3, the thickness of the second insulating structure 108 on the second conductive layer 104*b* may be varied. More specifically, the thickness of the second insulating structure 108 on the top surface 104*b*' of the second conductive layer 104*b* may be varied. In this embodiment, the second insulating structure 108 may include a third region 108A and a fourth region 108B, and the third region 108A may have a thickness $T_C$ and the fourth region 108B may have a thickness $T_D$. In some embodiments, the thickness $T_C$ of the third region 108A may be less than the thickness $T_D$ of the fourth region 108B, and the fourth region 108B may overlap the second conductive layer 104*b*.

Furthermore, in some embodiments, at least a portion of the third region 108A may be disposed in the overlapping region OA of the first conductive layer 104*a* and the second conductive layer 104*b*, and the fourth region 108B having a greater thickness may be mostly located outside the overlapping region OA or the capacitance adjustable region CA. In some embodiments, the difference between the thickness $T_C$ of the third region 108A and the thickness $T_D$ of the fourth region 108B may be in a range from 0.1 μm to 3 μm (i.e. 0.1 μm≤the thickness $T_D$≤3 μm), from 0.5 μm to 2.5 μm, or from 1 μm to 2 μm. In some embodiments, the thickness $T_C$ of the third region 108A may be in a range from 0.1 μm to 3 μm (i.e. 0.1 μm≤the thickness $T_C$≤3 μm), from 0.5 μm to 2.5 μm, or from 1 μm to 3 μm. In some embodiments, the thickness $T_D$ of the fourth region 108B may be in a range from 0.1 μm to 3.5 μm (i.e. 0.1 μm≤the thickness $T_D$≤3 μm), from 0.5 μm to 2.5 μm, from 1 μm to 3 μm, or from 1.5 μm to 3.5 μm.

Moreover, in accordance with some embodiments of the present disclosure, the "thickness" of the third region 108A or the fourth region 108B refers to the maximum thickness of the third region 108A or the fourth region 108B on the top surface 104B' of the second conductive layer 104B in the normal direction of the first substrate 102*a* or the second substrate 102*b* (for example, the Z direction shown in the figure). In addition, the thicknesses of the third insulating layer 108*a* and the fourth insulating layer 108*b* described below are also defined in the similar manner.

As described above, in some embodiments, the second insulating structure 108 may include the third insulating layer 108*a* and the fourth insulating layer 108*b*. In some embodiments, the third region 108A may include the third insulating layer 108*a*, and the fourth region 108B may include the third insulating layer 108*a* and the fourth insulating layer 108*b*. In some embodiments, the third region 108A may overlap with the first conductive layer 104*a*. In some embodiments, the fourth insulating layer 108*b* of the fourth region 108B may partially overlap with the second insulating layer 106*b* of the second region 106B.

In addition, the third insulating layer 108*a* may have a thickness $T_3$, and the fourth insulating layer 108*b* may have a thickness $T_4$. In some embodiments, the thickness $T_4$ of the fourth insulating layer 108*b* may be greater than the thickness $T_3$ of the third insulating layer 108*a*. In some embodiments, the thickness $T_3$ of the third insulating layer 108*a* may be in a range from 100 Å to 1500 Å (i.e. 100 Å≤the thickness $T_3$≤1500 Å), from 300 Å to 1300 Å, or from 500 Å to 1000 Å, for example, 600 Å, 700 Å, 800 Å, or 900 Å. In some embodiments, the thickness $T_4$ of the fourth insulating layer 108*b* may be in a range from 500 Å to 3000 Å (i.e. 500 Å≤the thickness $T_4$≤3000 Å), from 1000 Å to 2500 Å, or from 1500 Å to 2,000 Å, for example, 1600 Å, 1700 Å, 1800 Å, or 1900 Å.

Figure 4A:
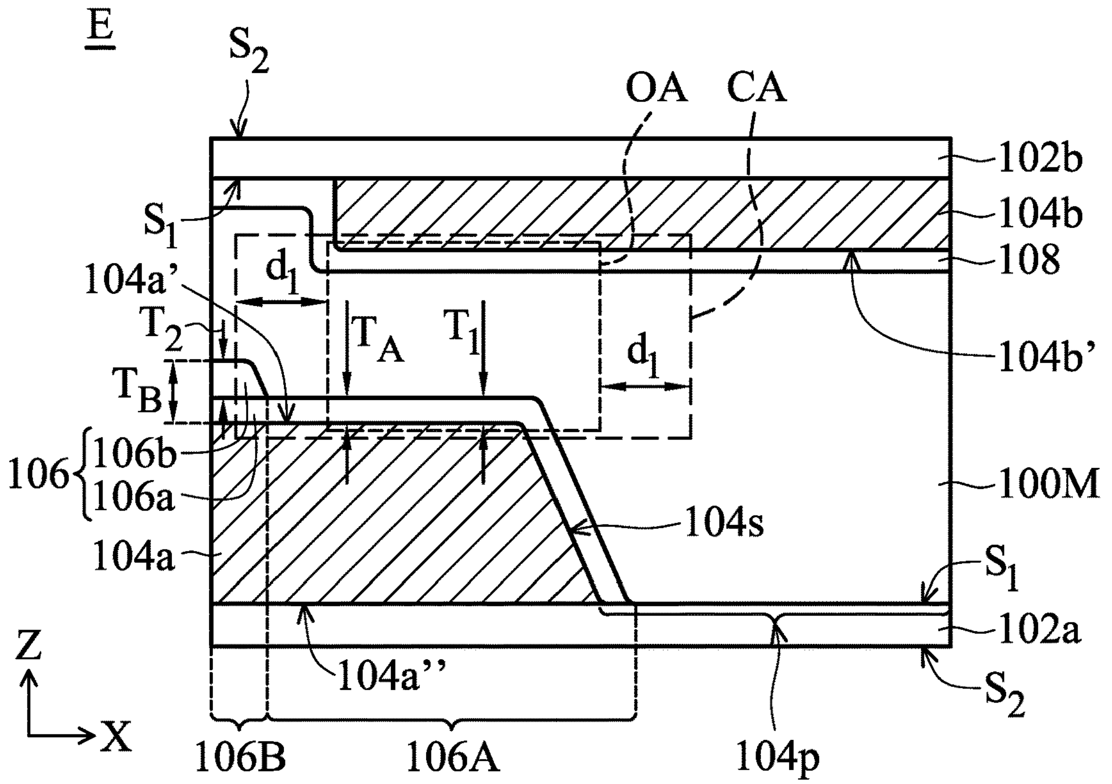
FIG. 4A illustrates the cross-sectional diagram of a portion of the electronic device in accordance with some embodiments of the present disclosure.
Figure 4B:
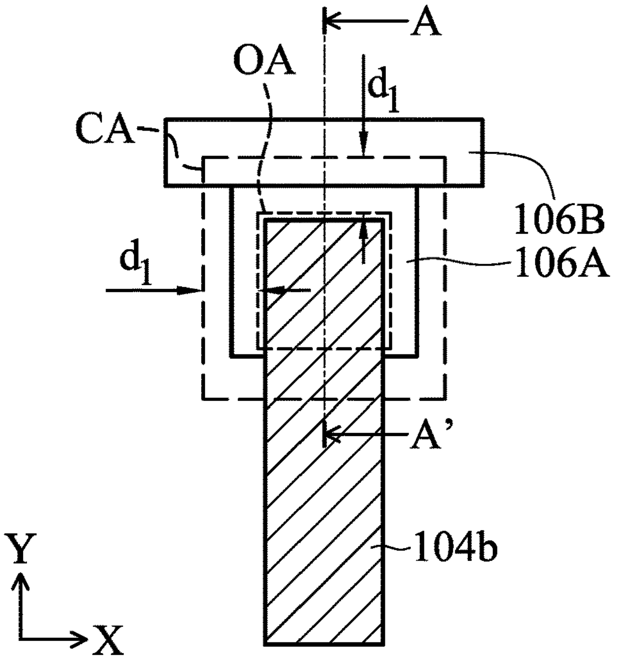
FIG. 4B illustrates the top-view diagram of a portion of the electronic device in accordance with some embodiments of the present disclosure.

Next, refer to FIG. 4A and FIG. 4B, which respectively illustrate the cross-sectional diagram of a portion of the electronic device 10 and the top-view diagram of a portion of the electronic device 10 in accordance with some other embodiments of the present disclosure, and FIG. 4A is the cross-sectional structure along the line segment A-A' in FIG. 4B. It should be understood that only the second conductive layer 104*b* and the first insulating structure 106 are shown in FIG. 4B and other components are omitted.

The embodiment shown in FIG. 4A is similar to the embodiment shown in FIG. 2A. The difference between them is that the second insulating layer 106*b* of the electronic device 10 shown in FIG. 4A does not extend into the opening 104*p*. Specifically, in this embodiment, the second insulating layer 106*b* may be at least partially disposed on the side surface 104*s* of the first conductive layer 104*a* that is adjacent to the opening 104*p*. Furthermore, as shown in FIGS. 4A and 4B, in some embodiments, a portion of the second insulating layer 106*b* may not overlap with the second conductive layer 104*b*.

In this embodiment, the first region 106A of the first insulating structure 106 may further extend adjacent the opening 104*p*, and the first region 106A may be adjacent to the opening 104*p*. In addition, at least a portion of the first region 106A may be disposed in the overlapping region OA of the first conductive layer 104*a* and the second conductive layer 104*b* and the capacitance adjustable region CA. In some embodiments, the first region 106A may be entirely disposed in the overlapping region OA.

As described above, the first region 106A may have a smaller thickness, and the overlapping region OA of the first conductive layer 104*a* and the second conductive layer 104*b* and the capacitance adjustable region CA may at least partially overlap with the first region 106A. The stability of the capacitance modulation therefore may be maintained. On the other hand, the second region 106B may have a larger thickness and is less likely to generate pinholes during the fabrication process, which may reduce the corrosion of the first conductive layer 104*a* or reduce the diffusion of metal ions of the first conductive layer 104 into the modulating material 100M.

Figure 5:
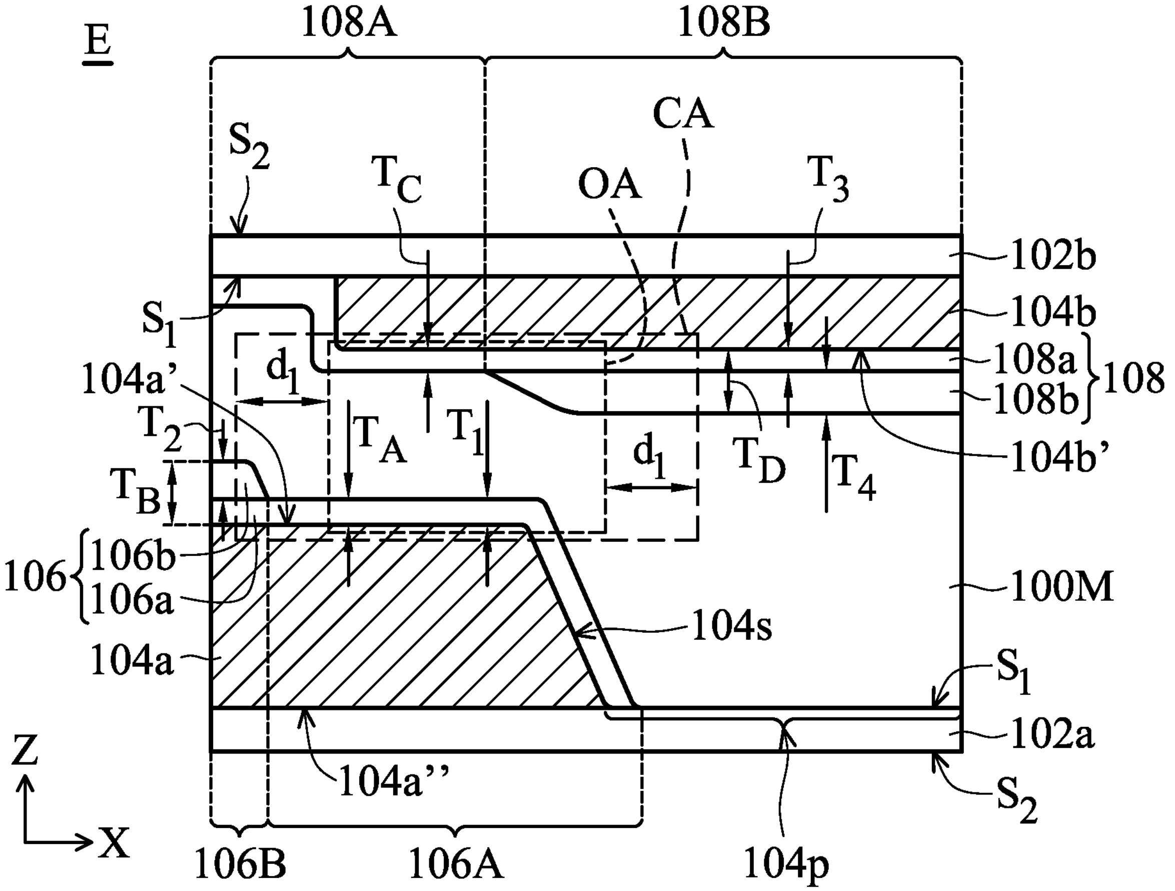
FIG. 5 illustrates the cross-sectional diagram of a portion of the electronic device in accordance with some embodiments of the present disclosure.

Next, refer to FIG. 5, which illustrates the cross-sectional diagram of a portion of the electronic device 10 in accordance with some other embodiments of the present disclosure. The embodiment shown in FIG. 5 is similar to the embodiment shown in FIG. 4A, except that the second insulating structure 108 of the electronic device 10 shown in FIG. 5 also has a greater thickness in a partial region. That is, the thickness of the second insulating structure 108 may be varied. As shown in FIG. 5, the second insulating structure 108 may be disposed between the second conductive layer 104*b* and the modulating material 100M. In this embodiment, the second insulating structure 108 may include the third insulating layer 108*a* and the fourth insulating layer 108*b* disposed on the third insulating layer 108*a*. The second insulating structure 108 in the embodiment shown in FIG. 5 is similar to that of FIG. 3, and thus will not be repeated herein.

To summarize the above, in the antenna device provided by the embodiments of the present disclosure, an insulating structure may have a smaller thickness in the portion corresponding to the capacitance adjustable region, thereby maintaining the stability of the capacitance modulation or improving the operational reliability of the antenna device. Furthermore, in accordance with some embodiments, the insulating structure may have a greater thickness in the portion other than the capacitance adjustable region, thereby the risk of corrosion of the conductive layer or diffusion of metal ions may be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. In addition, the features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:

a substrate;

a conductive layer disposed on the substrate and having a first opening penetrating through the conductive layer;

an insulating layer disposed on the conductive layer and comprising a second opening penetrating through the insulating layer, wherein the first opening of the conductive layer and the second opening of the insulating layer are at least partially overlapped; and a modulating material disposed on the insulating layer, wherein a width of the first opening of the conductive layer is greater than a width of the second opening of the insulating layer.

2. The electronic device as claimed in claim 1, wherein a portion of the insulating layer is disposed in the first opening of the conductive layer.

3. The electronic device as claimed in claim 1, wherein the modulating material comprises liquid crystal.

4. The electronic device as claimed in claim 1, wherein the insulating layer comprises an inorganic material.

5. The electronic device as claimed in claim 1, wherein the conductive layer comprises a metal material.

6. The electronic device as claimed in claim 1, wherein the electronic device is a display device.

7. The electronic device as claimed in claim 1, wherein the electronic device is an antenna device.

* * * * *